United States Patent
Dea et al.

(10) Patent No.: US 8,010,673 B2
(45) Date of Patent: Aug. 30, 2011

(54) TRANSITIONING NETWORK TRAFFIC BETWEEN LOGICAL PARTITIONS IN ONE OR MORE DATA PROCESSING SYSTEMS

(75) Inventors: Frank Dea, Austin, TX (US); Rakesh Sharma, Round Rock, TX (US); Satya Prakash Sharma, Austin, TX (US); Vinit Jain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/057,553

(22) Filed: Mar. 28, 2008

(65) Prior Publication Data

US 2008/0189417 A1    Aug. 7, 2008

Related U.S. Application Data

(63) Continuation of application No. 11/002,538, filed on Dec. 2, 2004, now abandoned.

(51) Int. Cl.
*G06F 15/173* (2006.01)

(52) U.S. Cl. ............................................. 709/226; 718/1

(58) Field of Classification Search .................. 709/226
See application file for complete search history.

(56) References Cited

U.S. PATENT DOCUMENTS

| | | | |
|---|---|---|---|
| 5,345,590 A | 9/1994 | Ault et al. | |
| 6,226,734 B1 | 5/2001 | Kleinsorge et al. | |
| 6,260,068 B1 * | 7/2001 | Zalewski et al. | 709/226 |
| 6,988,150 B2 | 1/2006 | Matters et al. | |
| 7,512,769 B1 * | 3/2009 | Lowell et al. | 711/203 |
| 7,664,823 B1 * | 2/2010 | Wakerly | 709/211 |
| 2001/0014097 A1 * | 8/2001 | Beck et al. | 370/401 |
| 2002/0087611 A1 | 7/2002 | Tanaka et al. | |
| 2002/0112102 A1 | 8/2002 | Tarui et al. | |
| 2003/0016649 A1 | 1/2003 | Connors | |
| 2003/0069972 A1 | 4/2003 | Yoshimura et al. | |
| 2003/0130833 A1 | 7/2003 | Brownell et al. | |
| 2003/0145122 A1 | 7/2003 | Banerjee et al. | |
| 2003/0154313 A1 | 8/2003 | Banerjee et al. | |
| 2003/0204593 A1 | 10/2003 | Brown et al. | |
| 2003/0208631 A1 | 11/2003 | Matters et al. | |
| 2003/0236852 A1 | 12/2003 | Fernandes et al. | |
| 2004/0143664 A1 | 7/2004 | Usa et al. | |
| 2004/0202185 A1 | 10/2004 | Ratcliff et al. | |
| 2005/0129040 A1 * | 6/2005 | Kiel et al. | 370/412 |
| 2005/0198381 A1 * | 9/2005 | Rorie | 709/239 |
| 2005/0232279 A1 * | 10/2005 | Brown et al. | 370/400 |
| 2005/0240932 A1 | 10/2005 | Billau et al. | |
| 2006/0090136 A1 | 4/2006 | Miller et al. | |
| 2007/0130566 A1 | 6/2007 | Van Rietschote et al. | |

OTHER PUBLICATIONS

Office Action dated Apr. 7, 2009, U.S. Appl. No. 11/002,538, USPTO.

(Continued)

*Primary Examiner* — Andrew Caldwell
*Assistant Examiner* — Ryan J Jakovac
(74) *Attorney, Agent, or Firm* — Dillon & Yudell LLP

(57) ABSTRACT

A method, system and computer program product for transitioning network traffic between logical partitions in one or more data processing systems are disclosed. The method includes defining a plurality of logical partitions with respect to one or more processing units of one or more data processing systems and dynamically reallocating resources from a second partition to a first partition among the plurality of logical partitions. Packets awaiting processing are transferred from the second partition to the first partition and processed on the first partition.

14 Claims, 8 Drawing Sheets

OTHER PUBLICATIONS

Office Action dated Apr. 30, 2009, U.S. Appl. No. 11/002,538, USPTO.

White et al.; "An Integrated Experimental Environment for Distributed Systems and Networks"; School of Computing, University of Utah; vol. 36, Issue SI (winter 2002); pp. 255-268; ISSN: 0163-5980.

Rooney et al.; "Automatic VLAN Creation Based on On-Line Measurement"; IBM Zurch Research Laboratory; vol. 29; Issue 3 (Jul. 1999); pp. 50-56; ISSN: 0146-4833.

Grenville Armitage; "Maximising Student Exposure to Networking Using FreeBSD Virtual Hosts"; Centre for Advanced Internet Architectures, Swinburne University of Technology, Melbourne, Australia; ACM SIGCOMM Computer Communications Review; vol. 33; Issue 3; Jul. 2003; pp. 137-147; ISSN: 0146-4833.

Arndt et al., "Infiniband Multicast Operation in an LPAR Environment", US Utility Patent Application, Filed Nov. 20, 2003, U.S. Appl. No. 10/718,299.

\* cited by examiner

TRANSITIONING NETWORK TRAFFIC BETWEEN LOGICAL PARTITIONS IN ONE OR MORE DATA PROCESSING SYSTEMS

CROSS-REFERENCE TO RELATED APPLICATION

The present application is a continuation of U.S. patent application Ser. No. 11/002,538, filed on Dec. 2, 2004, entitled "Method, System and Computer Program Product for Transitioning Network Traffic Between Logical Partitions in One or More Data Processing Systems" which is also related to the following co-pending U.S. patent applications and incorporated herein by reference in their entirety:

Ser. No. 11/002,560 filed on Dec. 2, 2004 entitled "METHOD AND SYSTEM FOR SHARED INPUT/OUTPUT ADAPTER IN LOGICALLY PARTITIONED DATA PROCESSING SYSTEM";

Ser. No. 10/413,618, filed on Apr. 14, 2003, entitled "MULTIPLE VIRTUAL LOCAL AREA NETWORK SUPPORT FOR SHARED NETWORK ADAPTERS";

U.S. Patent Application Publication No. US 2003/0236852 A1, published on Dec. 25, 2003, entitled "SHARING NETWORK ADAPTER AMONG MULTIPLE LOGICAL PARTITIONS IN A DATA PROCESSING SYSTEM";

U.S. Patent Application Publication No. US 2003/0145122 A1, published on Jul. 31, 2003, entitled "APPARATUS AND METHOD OF ALLOWING MULTIPLE PARTITIONS OF A PARTITIONED COMPUTER SYSTEM TO USE A SINGLE NETWORK ADAPTER"; and U.S. Pat. No. 6,631,422 B1, dated Oct. 7, 2003 entitled "NETWORK ADAPTER UTILIZING A HASHING FUNCTION FOR DISTRIBUTING PACKETS TO MULTIPLE PROCESSORS FOR PARALLEL PROCESSING".

BACKGROUND OF THE INVENTION

1. Technical Field

The present invention relates in general to sharing resources in data processing systems and in particular to reallocating resources between logical partitions of a data processing system. Still more particularly, the present invention relates to a system, method and computer program product for transitioning network traffic between logical partitions in one or more data processing systems.

2. Description of the Related Art

Logical partitioning (LPAR) of a data processing system permits several concurrent instances of one or more operating systems on a single processor, thereby providing users with the ability to split a single physical data processing system into several independent logical data processing systems capable of running applications in multiple, independent environments simultaneously. For example, logical partitioning makes it possible for a user to run a single application using different sets of data on separate partitions, as if the application was running independently on separate physical systems.

Partitioning has evolved from a predominantly physical scheme, based on hardware boundaries, to one that allows for virtual and shared resources, with load balancing. The factors that have driven partitioning have persisted from the first partitioned mainframes to the modern server of today. Logical partitioning is achieved by distributing the resources of a single system to create multiple, independent logical systems within the same physical system. The resulting logical structure consists of a primary partition and one or more secondary partitions.

The ability of a partitioned data processing system both to create and to close or dissolve concurrent instances of one or more operating systems on a single processor creates numerous technological challenges with regard to the migration of resources and processes from one partition to another. Among these challenges, a need for entities communicating with a process or a resource on a shared partition to continue to address and communicate with the process or resource, even after the partition hosting the process or resource has closed and the data processing system hosting the partition has moved the process or resource to a new partition, has become acute as a result of the increasing use of logical partitions as presences on a network through shared ethernet adapters and other communication technologies.

What is needed is a system, method and computer program product for transitioning network traffic between logical partitions in one or more data processing systems.

SUMMARY OF THE INVENTION

A method, system and computer program product for transitioning network traffic between logical partitions in one or more data processing systems are disclosed. The method includes defining a plurality of logical partitions with respect to one or more processing units of one or more data processing systems and dynamically reallocating resources from a second partition to a first partition among the plurality of logical partitions. Packets awaiting processing are transferred from the second partition to the first partition and processed on the first partition.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
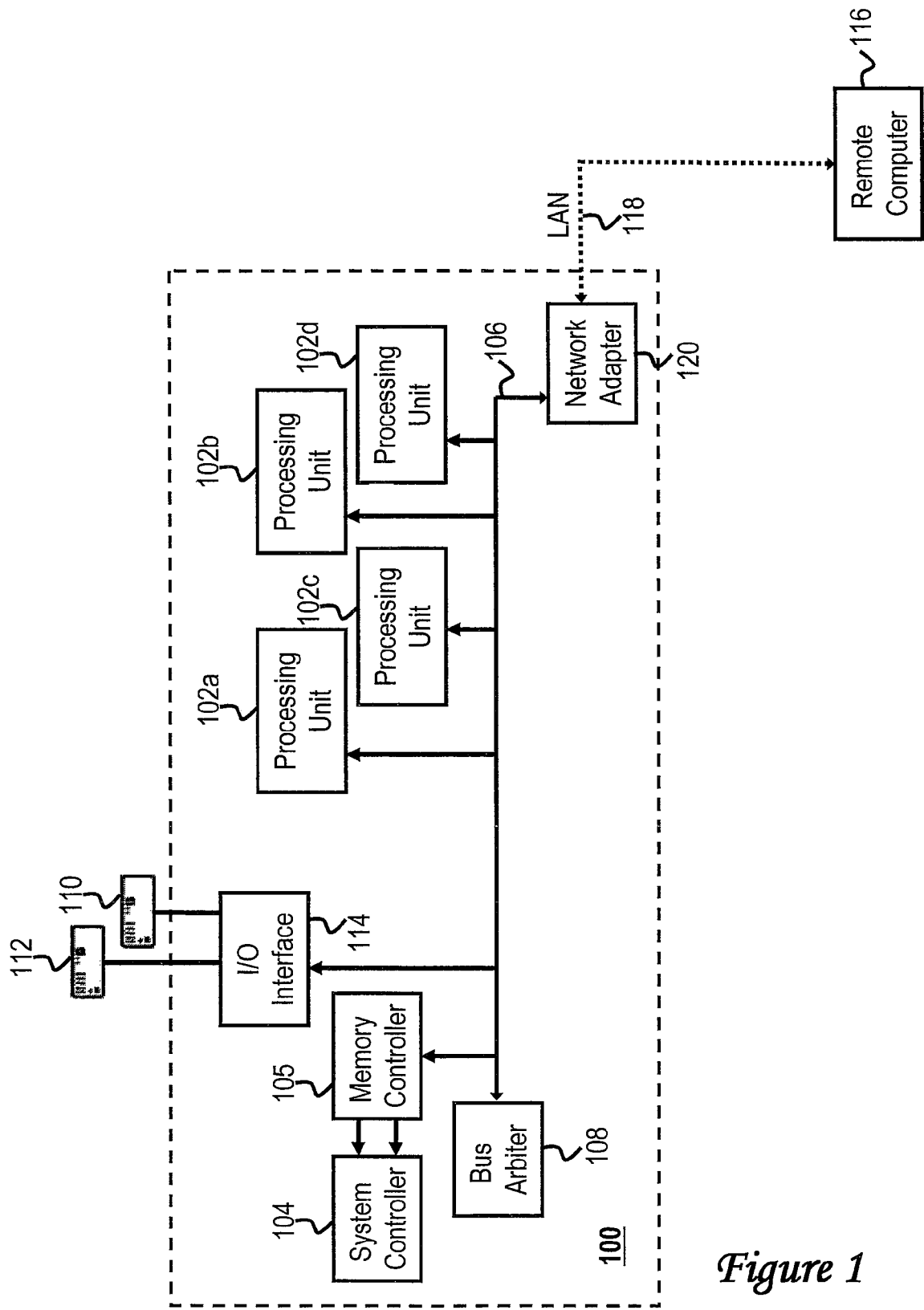
FIG. 1 illustrates a block diagram of a data processing system in which a preferred embodiment of the system, method and computer program product for sharing an input/output adapter in a logically partitioned data processing system are implemented.

With reference now to figures and in particular with reference to FIG. 1, there is depicted a data processing system 100 that may be utilized to implement the method, system and computer program product of the present invention. For discussion purposes, the data processing system is described as having features common to a server computer. However, as used herein, the term "data processing system," is intended to include any type of computing device or machine that is capable of receiving, storing and running a software product, including not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the present invention. While parts of the invention will be described in the general context of instructions residing on hardware within a server computer, those skilled in the art will recognize that the invention also may be implemented in a combination of program modules running in an operating system. Generally, program modules include routines, programs, components and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Data processing system 100 includes one or more processing units 102a-102d, a system memory 104 coupled to a memory controller 105, and a system interconnect fabric 106 that couples memory controller 105 to processing unit(s) 102 and other components of data processing system 100. Commands on system interconnect fabric 106 are communicated to various system components under the control of bus arbiter 108.

Data processing system 100 further includes fixed storage media, such as a first hard disk drive 110 and a second hard disk drive 112. First hard disk drive 110 and second hard disk drive 112 are communicatively coupled to system interconnect fabric 106 by an input-output (I/O) interface 114. First hard disk drive 110 and second hard disk drive 112 provide nonvolatile storage for data processing system 100. Although the description of computer-readable media above refers to a hard disk, it should be appreciated by those skilled in the art that other types of media which are readable by a computer, such as a removable magnetic disks, CD-ROM disks, magnetic cassettes, flash memory cards, digital video disks, Bernoulli cartridges, and other later-developed hardware, may also be used in the exemplary computer operating environment.

Data processing system 100 may operate in a networked environment using logical connections to one or more remote computers, such as remote computer 116. Remote computer 116 may be a server, a router, a peer device or other common network node, and typically includes many or all of the elements described relative to data processing system 100. In a networked environment, program modules employed by to data processing system 100, or portions thereof, may be stored in a remote memory storage device, such as remote computer 116. The logical connections depicted in FIG. 1A include connections over a local area network (LAN) 118, but, in alternative embodiments, may include a wide area network (WAN).

When used in a LAN networking environment, data processing system 100 is connected to LAN 118 through an input/output interface, such as a network adapter 120. It will be appreciated that the network connections shown are exemplary and other means of establishing a communications link between the computers may be used.

Figure 2:
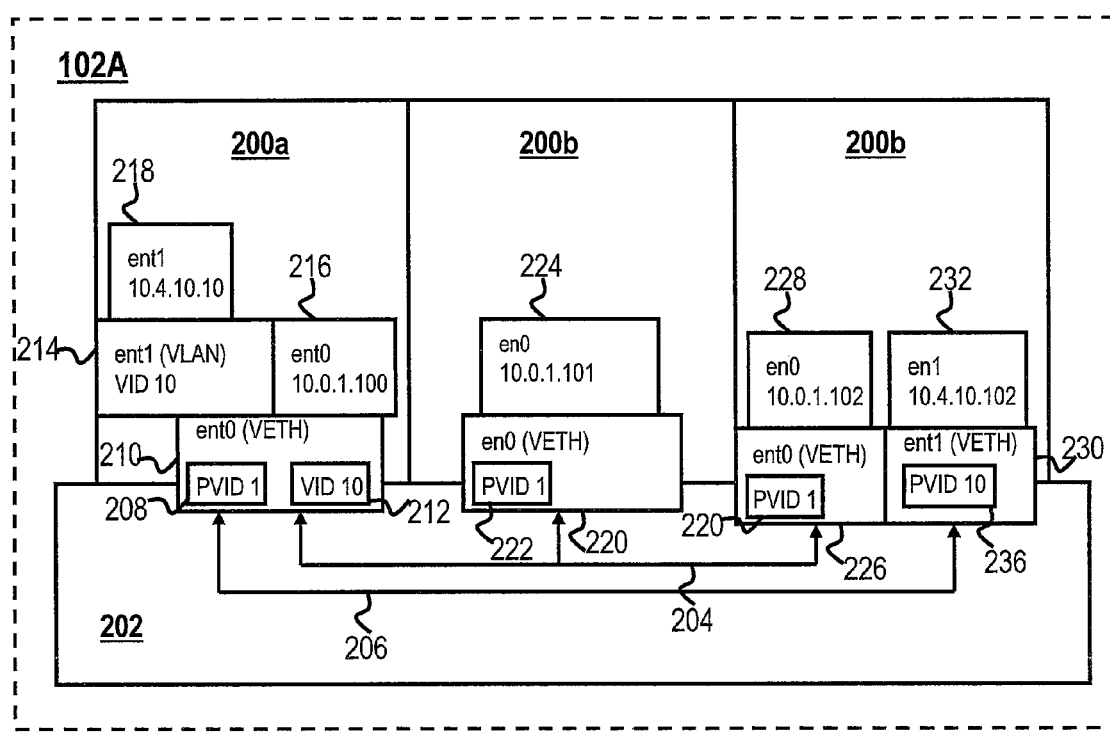
FIG. 2 illustrates virtual networking components in a logically partitioned processing unit in accordance with a preferred embodiment of the present invention.

Turning now to FIG. 2, virtual networking components in a logically partitioned processing unit in accordance with a preferred embodiment of the present invention are depicted. Processing unit 102a runs three logical partitions 200a-200c and a management module 202 for managing interaction between and allocating resources between logical partitions 200a-200c. A first virtual LAN 204, implemented within management module 202, provides communicative interaction between first logical partition 200a, second logical partition 200b and third logical partition 200c. A second virtual LAN 206, also implemented within management module 202, provides communicative interaction between first logical partition 200a and third logical partition 200c.

Each of logical partitions 200a-200c (LPARs) is a division of a resources of processors 102a, supported by allocations of system memory 104 and storage resources on first hard disk drive 110 and second hard disk drive 112. Both creation of logical partitions 200a-200c and allocation of resources on processor 102a and data processing system 100 to logical partitions 200a-200c are controlled by management module 202. Each of logical partitions 200a-200c and its associated set of resources can be operated independently, as an independent computing process with its own operating system instance and applications. The number of logical partitions that can be created depends on the processor model of data processing system 100 and available resources. Typically, partitions are used for different purposes such as database operation or client/server operation or to separate test and production environments. Each partition can communicate with the other partitions (as if the each other partition is in a separate machine) through first virtual LAN 204 and second virtual LAN 206.

First virtual LAN 204 and second virtual LAN 206 are examples of virtual Ethernet technology, which enables IP-based communication between logical partitions on the same system. Virtual LAN (VLAN) technology is described by the IEEE 802.IQ standard, incorporated herein by reference. VLAN technology logically segments a physical network, such that layer 2 connectivity is restricted to members that belong to the same VLAN. As is further explained below, this separation is achieved by tagging Ethernet packets with VLAN membership information and then restricting delivery to members of a given VLAN.

VLAN membership information, contained in a VLAN tag, is referred to as VLAN ID (VID). Devices are configured as being members of VLAN designated by the VID for that device. Devices such as ent(0), as used in the present description define an instance of a representation of an adapter or a pseudo-adaptor in the functioning of an operating system. The default VID for a device is referred to as the Device VID (PVID). Virtual Ethernet adapter 208 is identified to other members of first virtual LAN 202 at device ent0, by means of PVID 1 210 and VID 10 212. First LPAR 200a also has a VLAN device 214 at device ent1 (VID 10), created over the base Virtual Ethernet adapter 210 at ent0, which is used to communicate with second virtual LAN 206. First LPAR 200*a* can also communicate with other hosts on the first virtual LAN 204 using the first virtual LAN 204 at device ent0, because management module 202 will strip the PVID tags before delivering packets on ent0 and add PVID tags to any packets that do not already have a tag. Additionally, first LPAR 200*a* has VLAN IP address 216 for Virtual Ethernet adapter 208 at device ent0 and a VLAN IP address 218 for VLAN device 214 at device ent1.

Second LPAR 200*b* also has a single Virtual Ethernet adapter 220 at device ent0, which was created with PVID 1 222 and no additional VIDs. Therefore, second LPAR 200*b* does not require any configuration of VLAN devices. Second LPAR 200*b* communicates over first VLAN 204 network by means of Virtual Ethernet adapter 220 at device ent0. Third LPAR 200*c* has a first Virtual Ethernet adapter 226 at device ent0 with a VLAN IP address 230 and a second Virtual Ethernet adapter 228 at device ent1 with a VLAN IP address 232, created with PVID 1 234 and PVID 10 236, respectively. Neither second LPAR 200*b* nor third LPAR 200*c* has any additional VIDs defined. As a result of its configuration, third LPAR 200*c* can communicate over both first virtual LAN 204 and second virtual LAN 206 using first Virtual Ethernet adapter 226 at device ent0 with a VLAN IP address 230 and a second Virtual Ethernet adapter 228 at device ent1 with a VLAN IP address 232, respectively.

Figure 3:
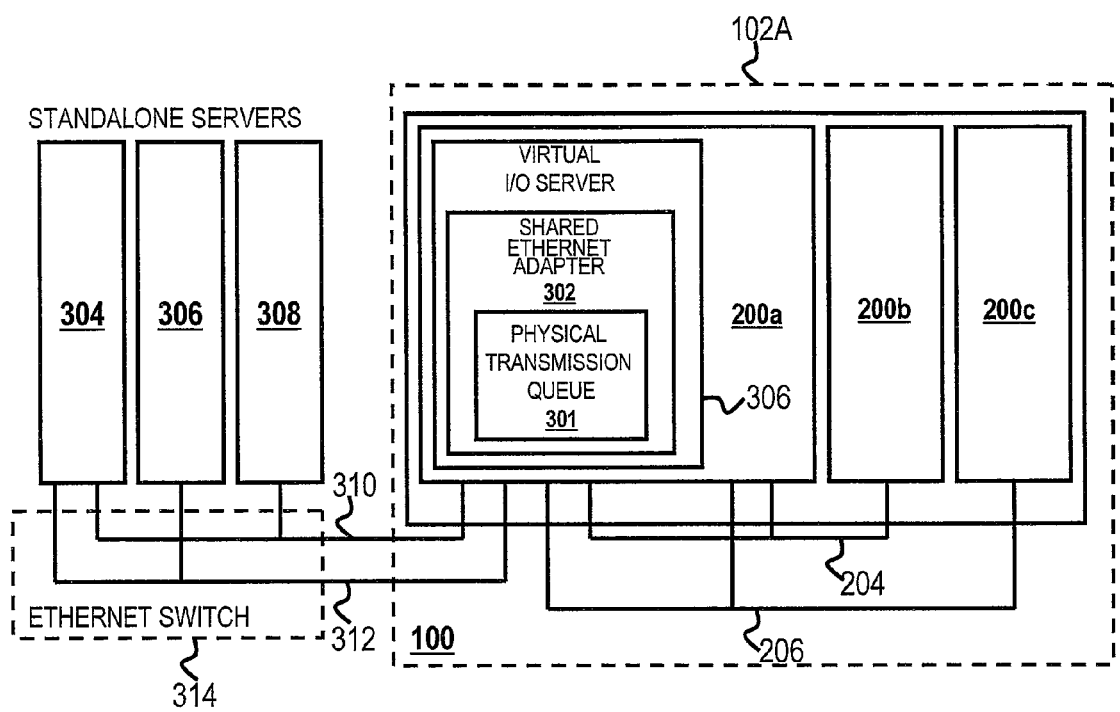
FIG. 3 depicts an Ethernet adapter shared by multiple logical partitions of a processing unit in accordance with a preferred embodiment of the present invention.

With reference now to FIG. 3, an Ethernet adapter shared by multiple logical partitions of a processing unit in accordance with a preferred embodiment of the present invention is illustrated. Data processing system 100, containing processing unit 102*a*, which is logically partitioned into logical partitions 200*a*-200*c* (LPARs), also runs virtual I/O server 300, which contains a shared Ethernet adapter 302, for interacting with network interface 120 to allow first LPAR 200*a*, second LPAR 200*b*, and third LPAR 200*c* to communicate among themselves and with first standalone data processing system 304, second standalone data processing system 306, and third standalone data processing system 308 over a combination of first virtual LAN 204, second virtual LAN 206, first remote LAN 310, and second remote LAN 312 through Ethernet switch 314. First LPAR 200*a* provides connectivity between virtual I/O server 300, and is called a hosting partition.

While Virtual Ethernet technology is able to provide communication between LPARs 200*a*-200*c* on the same data processing system 100, network access outside data processing system 100 requires a physical adapter, such as network adapter 120 to interact with remote LAN 310, and second remote LAN 312. In the prior art, interaction with remote LAN 310, and second remote LAN 312 was achieved by assigning a physical network adapter 120 to every LPAR that requires access to an outside network, such as LAN 118. In the present invention, a single physical network adapter 120 is shared among multiple LPARs 200*a*-200*c*.

In the present invention, a special module within first partition 200*a*, called Virtual I/O server 300 provides an encapsulated device partition that provides services such as network, disk, tape and other access to LPARs 200*a*-200*c* without requiring each partition to own an individual device such as network adapter 120. The network access component of Virtual I/O server 300 is called the Shared Ethernet Adapter (SEA) 302. While the present invention is explained with reference to SEA 302, for use with network adapter 120, the present invention applies equally to any peripheral adapter or other device, such as I/O interface 114.

SEA 302 serves as a bridge between a physical network adapter 120 or an aggregation of physical adapters and one or more of first virtual LAN 204 and second virtual LAN 206 on the Virtual I/O server 300. Additionally SEA 302 contains a physical transmission queue 301 for storing packets that must be held, prior to transmission. SEA 302 enables LPARs 200*a*-200*c* on first virtual LAN 204 and second virtual LAN 206 to share access to physical Ethernet switch 314 through network adapter 120 and communicate with first standalone data processing system 304, second standalone data processing system 306, and third standalone data processing system 308 (or LPARs running on first standalone data processing system 304, second standalone data processing system 306, and third standalone data processing system 308).

SEA 302 provides this access by connecting, through management module 202, first virtual LAN 204 and second virtual LAN 206 with remote LAN 310 and second remote LAN 312, allowing machines and partitions connected to these LANs to operate seamlessly as member of the same VLAN. Shared Ethernet adapter 302 enables LPARs 200*a*-200*c* on processing unit 102*a* of data processing system 100 to share an IP subnet with first standalone data processing system 304, second standalone data processing system 306, and third standalone data processing system 308 and LPARs on processing units 102*b*-*d* to allow for a more flexible network.

SEA 302 processes packets at layer 2. Because the SEA 302 processes packets at layer 2, the original MAC address and VLAN tags of a packet remain visible to first standalone data processing system 304, second standalone data processing system 306, and third standalone data processing system 308 on the Ethernet switch 314.

Figure 4:
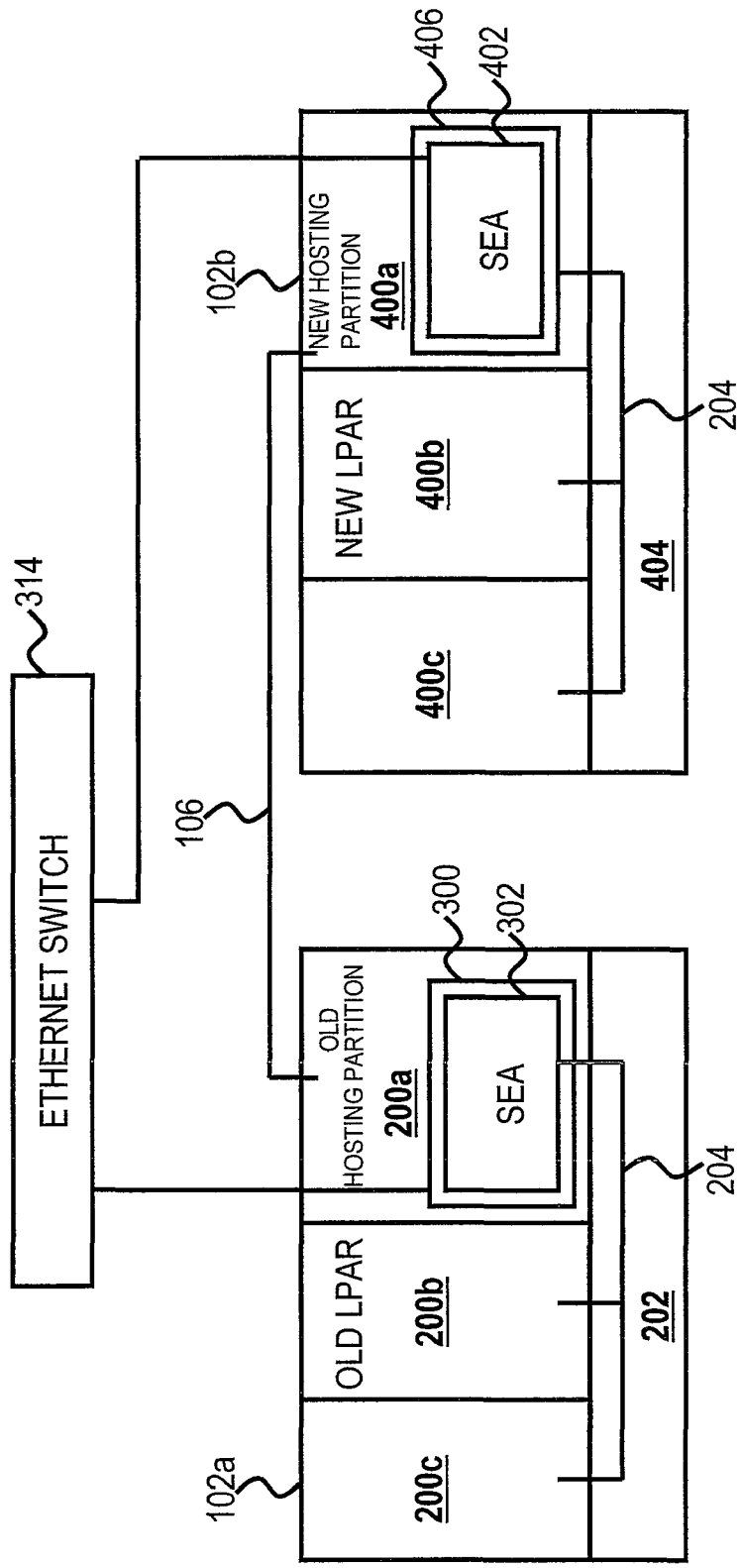
FIG. 4 depicts a transition of processing resources between logical partitions on a processing unit in accordance with a preferred embodiment of the present invention.

Turning now to FIG. 4, a transition of processing resources between logical partitions on a processing unit in accordance with a preferred embodiment of the present invention is depicted. Processing unit 102*a* runs three logical partitions 200*a*-200*c* and a management module 202 for managing interaction between and allocating resources between logical partitions 200*a*-200*c*. A first virtual LAN 204, implemented within management module 202, provides communicative interaction between first logical partition 200*a*, which serves as a hosting partition and contains shared Ethernet adapter 302, and second logical partition 200*b* and third logical partition 200*c*. Similarly, processing unit 102*b* runs three logical partitions 400*a*-400*c* and a management module 404 for managing interaction between and allocating resources between logical partitions 400*a*-400*c*. First virtual LAN 204, shared across Ethernet switch 314 and implemented within management module 404, provides communicative interaction between first logical partition 400*a*, which serves as a hosting partition and contains shared Ethernet adapter 402, and second logical partition 200*b* and third logical partition 200*c*.

Communication between processing unit 102*a* and processing unit 102*b* is available across Ethernet switch 314 or, in situations where a higher-speed link is desired, across system interconnect fabric 106. SEA 302 resides within virtual I/O server 300 on (hosting) logical partition 200*a* of processing unit 102*a* while SEA 402 resides within virtual I/O server 406 on (hosting) logical partition 400*a* of processing unit 102*b*. While the exemplary preferred embodiment of FIG. 4 is illustrated for the sake of simplicity with respect to partitions existing on separate processors within data processing system 100, one skilled in the art will quickly realize that the present invention could be performed and will frequently be performed with respect to processors residing on separate data processing systems and in separate physical locations, such as data processing system 100 and remote computer 116.

In FIG. 4, processing unit 102*a* and processing unit 102*b* are migrating a resource or process, hereafter called an image, from second logical partition 200*b* on processing unit 102*a* to second logical partition 400b on processing unit 102b. For convenience, sending second logical partition 200b and first (hosting) logical partition 200a processing unit 102a are labeled as "old" and receiving second logical partition 400b and first (hosting) logical partition 400a on processing unit 102b are labeled as "new" in FIG. 4. To accomplish the migration, first (hosting) partition 200a on processing unit 102a copies all memory pages associated with the migrating resource or process on second logical partition 200b across a high-speed link such as system interconnect fabric 106 (or Ethernet switch 314) to first (hosting) partition 400a on processing unit 102b for association with second logical partition 400b on processing unit 102b. Most operating system components are not aware of the migration because hardware MAC addresses within the first virtual LAN 204 for second logical partition 200b on processing unit 102a are transferred to second logical partition 400b on processing unit 102b.

As the migration shown in FIG. 4 progresses, Ethernet packets in flight are in transit into Ethernet switch 314 via SEA 302 first (hosting) logical partition 200a of processing unit 102a. Based on the packets in flight, network switching infrastructure such as Ethernet switch 314 becomes aware of the transition at work in FIG. 4 and forwards incoming packets, which were destined for the process or resource on second logical partition 200b on processing unit 102a, to second logical partition 400b on processing unit 102b. The handling of packets in flight at the time of switchover from a sending partition to a receiving partition is discussed below and in greater detail with respect to FIGS. 5-8.

After the point of switchover (from second logical partition 200b on processing unit 102a to second logical partition 400b on processing unit 102b), virtual I/O server 300 on first logical partition 200a of processing unit 102a will forward any packets, which packets are being sent by second logical partition 200b via first logical partition 200a on processing unit 102a, to first logical partition 400a on processing unit 102b. First logical partition 400a on processing unit 102b queues the forwarded packets on processing unit 102b in a private queue within virtual I/O server 406 until receipt of a notification from first logical partition 200a on processing unit 102a that all old packets are transmitted. Incoming packets received at first logical partition 200a of processing unit 102a are similarly forwarded to first logical partition 400a on processing unit 102b, as is discussed with respect to FIG. 6. As is detailed with respect to FIG. 7, first logical partition 200a on processing unit 102a determines that all old packets have been transmitted when the number of packets transmitted by first logical partition 200a on processing unit 102a exceeds the number of packets queued in physical transmission queue 301.

Figure 5:
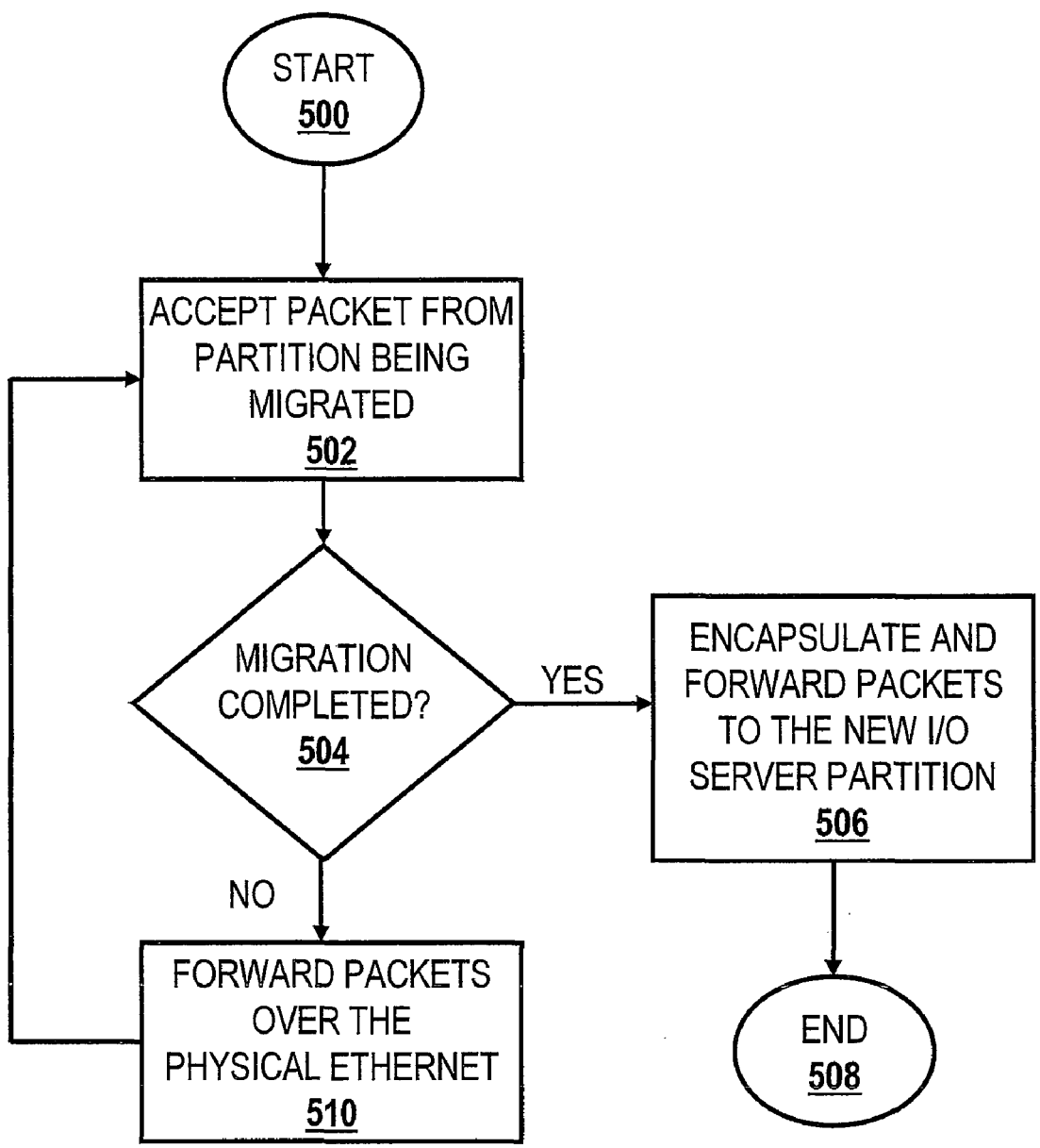
FIG. 5 is a high-level flowchart for handling a packet received by a server handling packets output from partition being migrated in accordance with a preferred embodiment of the present invention.

With reference now to FIG. 5, a high-level flowchart for handling a packet received by a server handling packets output from a partition being migrated in accordance with a preferred embodiment of the present invention is shown. The process starts at step 500. The process then moves to step 502, which illustrates SEA 302 within virtual I/O server 300 of first (hosting) partition 200a of processing unit 102a accepting a packet from second partition 200b, from which a process or resource is being migrated. The process next proceeds to step 504, which illustrates virtual I/O server 300 determining whether migration of the process or resource from second partition 200b on processing unit 102a to second partition 400b on processing unit 102b has been completed. If the migration of the process or resource from second partition 200b on processing unit 102a to second partition 400b on processing unit 102b has been completed, then the process next moves to step 506. At step 506, virtual I/O server 300 on first partition 200a encapsulates the received packet and SEA 302 forwards the received packet to SEA 402 of virtual I/O server 406 on first partition 400a of processing unit 102b. The process then ends at step 508.

If, in step 504, virtual I/O server 300 determines that migration of the process or resource from second partition 200b of processing unit 102a to second partition 400b of processing unit 102b has not completed, then the process next proceeds to step 510. At step 510, SEA 302 of virtual I/O server 300 on first partition 200a of processing unit 102a forwards the received packet over the physical Ethernet or other LAN 118 through Ethernet switch 314. The process then moves to step 502, as described above.

Figure 6:
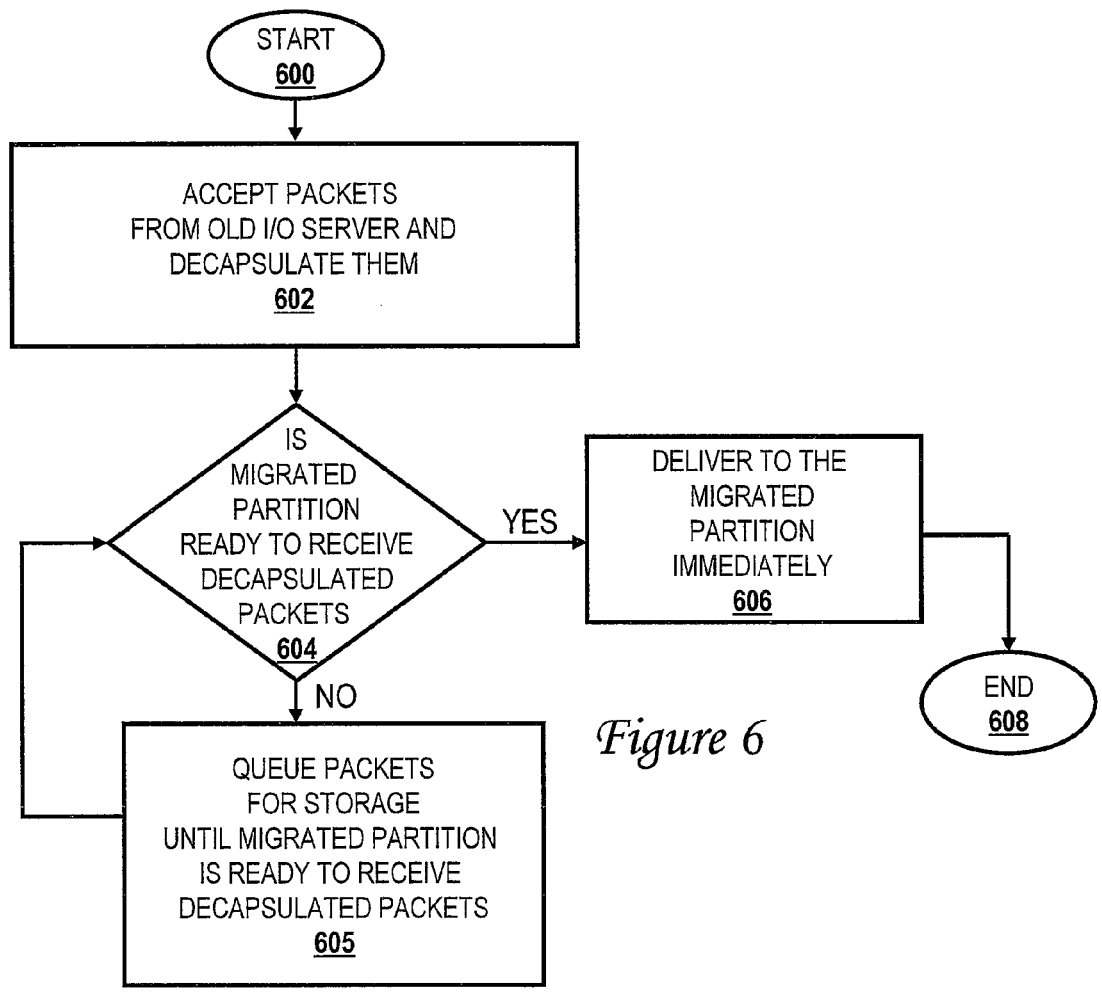
FIG. 6 is a high-level flowchart for handling a packet received on a new I/O server accordance with a preferred embodiment of the present invention.

Turning now to FIG. 6, a high-level flowchart for handling a packet received on an I/O server hosting an LPAR to which a process or resource is being migrated in accordance with a preferred embodiment of the present invention is depicted. The process starts at step 600. The process then moves to step 602, which illustrates SEA 402 of virtual I/O server 406 on first partition 400a of processing unit 102b accepting and decapsulating packets received from SEA 302 on virtual I/O server 300 of first partition 200a on processing unit 102a. Accepted packets are decapsulated by virtual I/O server 406 as they are accepted by SEA 402. The process next proceeds to step 604, which depicts virtual I/O server 406 on first partition 400a of processing unit 102b determining whether the process or resource migrated to second partition 400b of processing unit 102b is ready to receive the packets decapsulated in step 602. If, in step 604, virtual I/O server 406 determines that the process or resource migrated from second logical partition 200b of processing unit 102a to second partition 400b of processing unit 102b is ready to receive the packets decapsulated in step 602, then the process next proceeds to step 606. In step 606, virtual I/O server 406 within first partition 400a of processing unit 102b delivers the packets received and decapsulated in step 602 to second partition 400b over virtual Ethernet 204. The process then ends at step 608.

If, at step 604, virtual I/O server 406 within first partition 400a of processing unit 102b determines that the process resource being migrated from second logical partition 200b on processing unit 102a to second partition 400b on processing unit 102b is not ready to receive the decapsulated packets, then the process moves to step 605.

Step 605 depicts SEA 402 of virtual I/O server 406 on first partition 400a of processing Lit 102b queuing the packets received in Step 602 for storage until the process or resource being migrated from second logical partition 200b on processing unit 102a to second partition 400b on processing unit 102b is ready to receive the decapsulated packets. The process then returns to Step 604, as described above.

Figure 7:
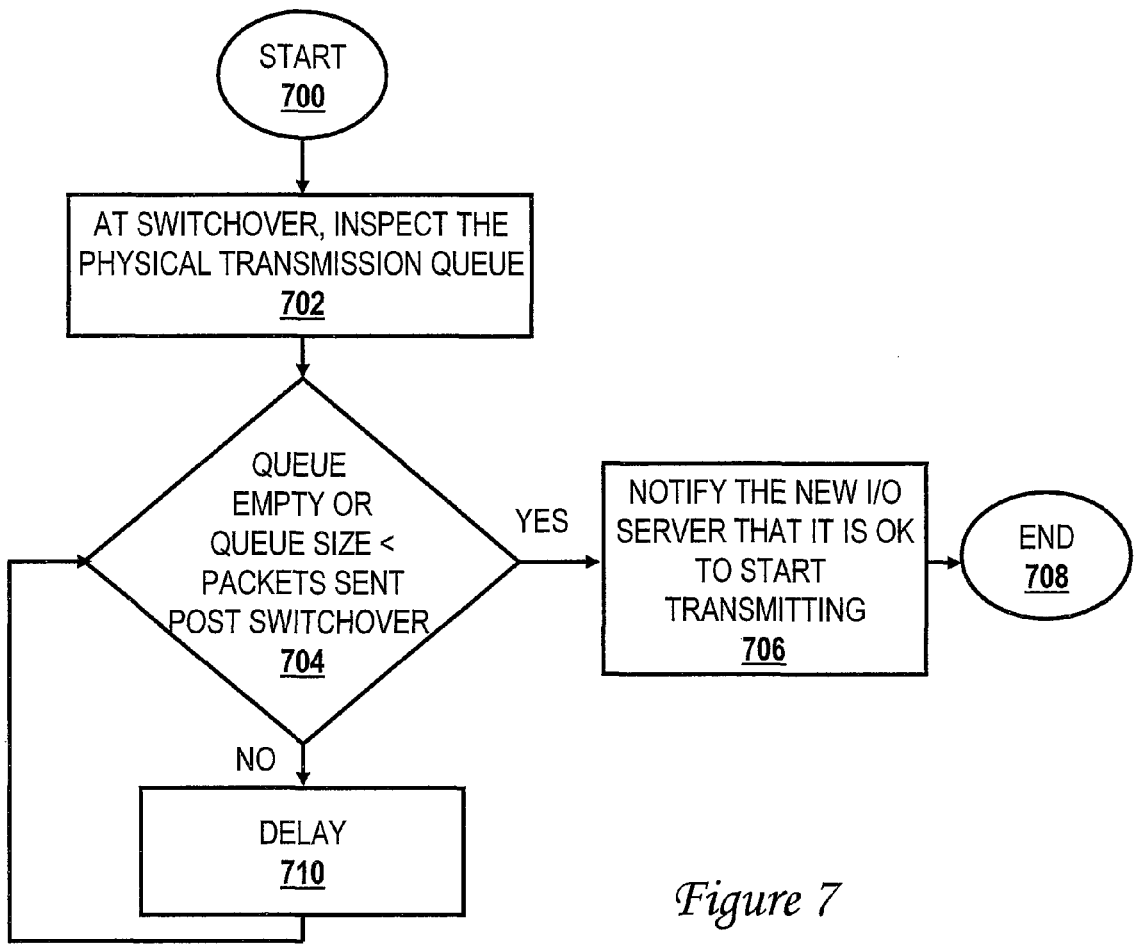
FIG. 7 is a high-level flowchart for queue monitoring at switchover on a server supporting a partition from which a process or resource is being migrated in accordance with a preferred embodiment of the present invention.

With reference now to FIG. 7, there is illustrated a high-level flowchart for queue monitoring at switchover on a server supporting a partition from which a process or resource is being migrated, in accordance with a preferred embodiment of the present invention. The process starts at step 700. The process then moves to step 702, which illustrates virtual I/O server 300 on first logical partition 200a of processing unit 102a inspecting physical transmission queue 301 within virtual I/O server 300. The process next proceeds to step 704, which depicts virtual I/O server 300 determining whether physical transmission queue 301, inspected in step 702, is empty or the volume of packets stored in physical transmission queue 301 is smaller than the number of packets sent after switchover. If, in step 704, it is determined that the queue is empty or that queue size is less than the packets sent after switchover, the process then proceeds to step 706, which illustrates notifying the new I/O server, virtual I/O server 406 on first partition 400*a* of processing unit 102*b*, to begin transmitting packets. The process then ends at step 708.

In step 704, if it determined that physical transmission queue 301 is empty or the volume of packets stored in physical transmission queue 301 is larger than the number of packets sent after switchover, the process then moves to step 710, which depicts virtual I/O server 406 executing a delay. The process then proceeds to step 704, as described above.

Figure 8:
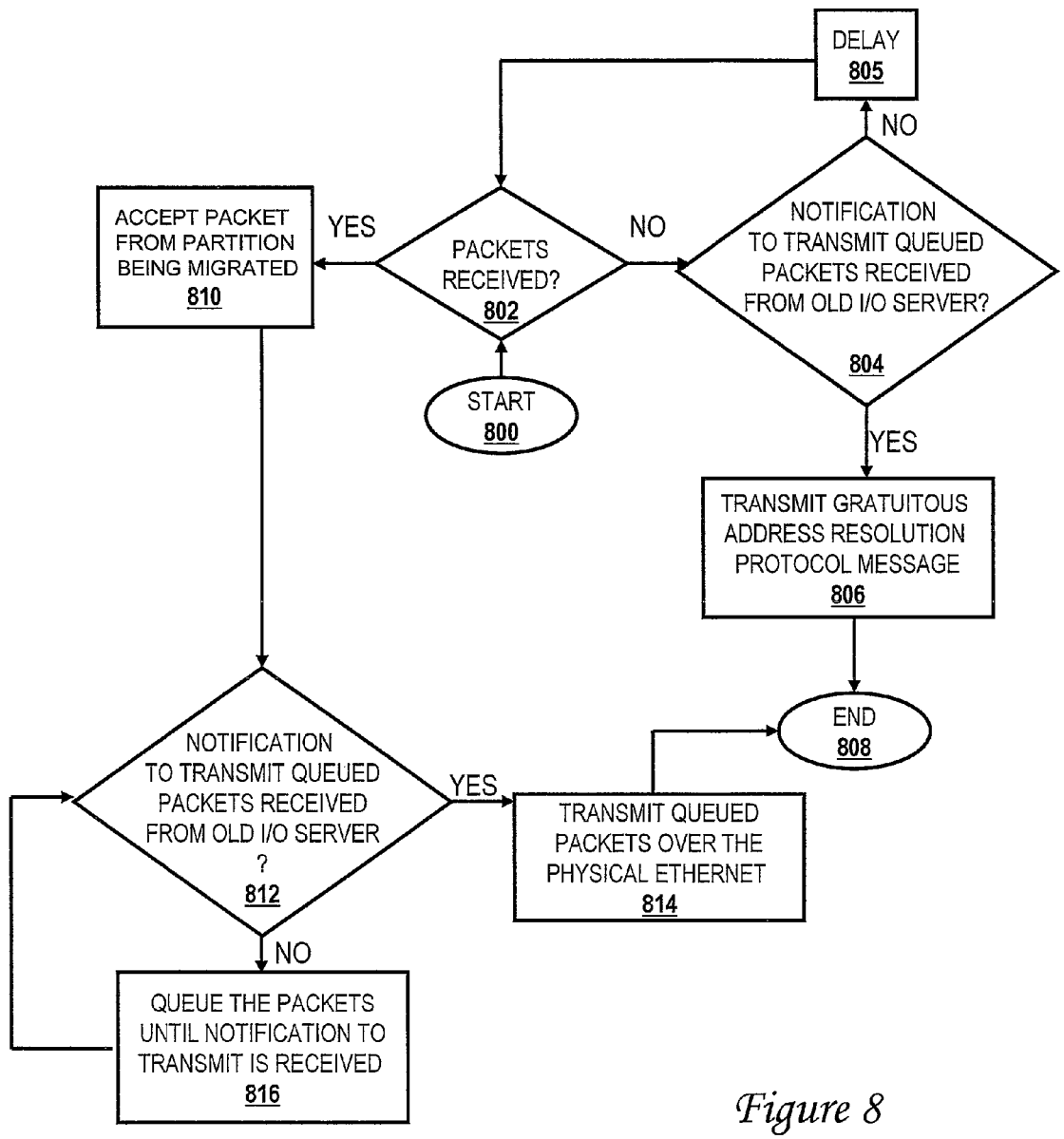
FIG. 8, is a high-level flowchart for handling packet migration on an I/O server hosting an LPAR to which a process.

Turning now to FIG. 8, a high-level flowchart for handling packet migration on an I/O server hosting an LPAR to which a process or resource is being migrated in accordance with a preferred embodiment of the present invention is depicted. The process starts at step 800. The process then moves to step 802, which illustrates SEA 402 of virtual I/O server 406 on first partition 400*a* of processing unit 102*b* determining whether packets have been received from SEA 302 on virtual I/O server 300 of first partition 200*a* on processing unit 102*a*. If SEA 402 of virtual I/O server 406 on first partition 400*a* of processing unit 102*b* determines that no packets have been received from SEA 302 on virtual I/O server 300 of first partition 200*a* on processing unit 102*a*, then the process proceeds to step 804. Step 804 depicts virtual I/O server 406 on hosting partition 400*a* of processing unit 102*b* determining whether notification to transmit queued packets has been received from virtual I/O server 300 within first partition 200*a* of processing unit 102*a*. If, in step 804, virtual I/O server 106 within first partition 400*a* of processing unit 102*b* determines that notification to transmit has been received, the process then proceeds to step 806, which depicts virtual I/O server 406 on first partition 400*a* of processing unit 102*b* transmitting a gratuitous address resolution message, indicating the new address of the migrated partition, to Ethernet switch 314 over physical Ethernet or LAN 118 through SEA 402. The process then ends at step 808.

Returning to step 804, if, in step 804, virtual I/O server 106 within first partition 400*a* of processing unit 102*b* determines that notification to transmit has not been received, the process then proceeds to step 805, which depicts virtual I/O server 406 on first partition 400*a* of processing unit 102*b* delaying action. The process next returns to step 802, as described above. If, in step 802, SEA 402 of virtual I/O server 406 on first partition 400*a* of processing unit 102*b* determines that packets have been received from SEA 302 on virtual I/O server 300 of first partition 200*a* on processing unit 102*a*, then the process proceeds to step 810, which depicts SEA 402 of virtual I/O server 406 on first partition 400*a* of processing unit 102*b* accepting packets received from SEA 302 on virtual I/O server 300 of first partition 200*a* on processing unit 102*a*.

The process next moves to Step 812, which depicts virtual I/O server 406 on hosting partition 400*a* of processing unit 102*b* determining whether notification to transmit queued packets has been received from virtual I/O server 300 within first partition 200*a* of processing unit 102*a*. If, in step 812, virtual I/O server 106 within first partition 400*a* of processing unit 102*b* determines that notification to transmit has been received, the process then proceeds to step 814, which depicts virtual I/O server 406 on first partition 400*a* of processing unit 102*b* transmitting queued packets. The process then ends at step 808, as discussed above.

If, in step 812, virtual I/O server 106 within first partition 400*a* of processing unit 102*b* determines that notification to transmit has not been received, the process then proceeds to step 816, which illustrates virtual I/O server 406 on first partition 400*a* of processing unit 102*b* queuing packets for storage until notification to transmit is received. The process then returns to step 812, as discussed above.

The present invention provides for smooth migration of a resource or process from second logical partition 200*b* on processing unit 102*a* to second logical partition 400*b* on processing unit 102*b*. As was discussed above, the present invention ensures that once a migrated image starts to operate on second logical partition 400*b* on processing unit 102*b*, no packets are sent from second logical partition 200*b* on processing unit 102*a*. Further, the present invention minimizes the number of dropped packets during migration of a resource or process, from second logical partition 200*b* on processing unit 102*a* to second logical partition 400*b* on processing unit 102*b* by providing a method of forwarding. The preferred embodiment ensures that network switching fabric never receives interleaving packets with the same Ethernet MAC address from both of second logical partition 200*b* on processing unit 102*a* and second logical partition 400*b* on processing unit 102*b*.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method for transitioning network traffic between logical partitions in one or more data processing systems, said method comprising:
dynamically migrating an image from a second partition to a first partition among a plurality of logical partitions defined with respect to one or more processing units of one or more data processing systems, wherein said migrating includes a virtual Ethernet adapter of said first partition assuming a MAC address of a virtual Ethernet adapter of said second partition;
for outbound network traffic of the image:
during migration of the image, the second partition forwarding the outbound network traffic of the image to a physical network;
when migration of the image is complete, the second partition forwarding the outbound network traffic of the image to the first partition;
for inbound network traffic of the image:
during migration of the image, the second partition transferring inbound network traffic of the image to said first partition, and the first partition holding inbound network traffic at said first partition until said transferring has completed; and
the migrated image processing network traffic on said first partition, wherein said processing includes transmitting from the first logical partition the outbound network traffic of the image forwarded by said second logical partition to the first logical partition.

2. A data processing system comprising:
a processing unit;
data storage coupled to the processing unit; and
program code within the data storage and executable by the processing unit, wherein the program code, when executed by the processing unit, causes the data processing system to perform:
dynamically migrating an image from a second partition to a first partition among a plurality of logical partitions defined with respect to one or more processing units of the one or more data processing systems, wherein said migrating includes a virtual Ethernet adapter of said first partition assuming a MAC address of a virtual Ethernet adapter of said second partition;
for outbound network traffic of the image:
during migration of the image, the second partition forwarding the outbound network traffic of the image to a physical network;
when migration of the image is complete, the second partition forwarding the outbound network traffic of the image to the first partition; for inbound network traffic of the image:
during migration of the image, the second partition transferring inbound network traffic of the image to said first partition, and the first partition holding said inbound network traffic at said first partition until said transferring has completed; and
the migrated image processing network traffic on said first partition, wherein said processing includes transmitting from the first logical partition the outbound network of the image forwarded by said second logical partition to the first logical partition.

3. A computer program product for transitioning network traffic between logical partitions in one or more data processing systems, said computer program product comprising:
a non-transitory computer-readable storage medium; and
program code stored on the computer-readable storage medium and executable by a data processing system to transition network traffic between a plurality of logical partitions defined with respect to one or more processing units of the one or more data processing systems, wherein said program code causes the data processing system to perform:
dynamically migrating an image from a second partition to a first partition among said plurality of logical partitions, wherein said migrating include causing a virtual Ethernet adapter of said first partition to assume a MAC address of a virtual Ethernet adapter of said second partition;
for outbound network traffic of the image:
during migration of the image, the second partition forwarding the outbound network traffic of the image to a physical network;
when migration of the image is complete, the second partition forwarding the outbound network traffic of the image to the first partition; for inbound network traffic of the image:
during migration of the image, the second partition transferring inbound network traffic of the image to said first partition, and the first partition holding said inbound network traffic until said transferring has completed; and
the migrated image processing network traffic on said first partition, wherein said processing includes transmitting from the first logical partition the outbound network traffic packets of the image forwarded by said second logical partition to the first logical partition.

4. The method of claim 1, wherein said migrating further comprises said second partition discovering network information relating to said first partition.

5. The method of claim 1, further comprising:
following the migrating, suspending activity of said second partition by reallocating all resources of said second partition.

6. The method of claim 1, further comprising:
designating said first partition as a recipient of all packets designated for said first partition and said second partition.

7. The method of claim 1, wherein:
the image comprises a process; and
the migrating includes migrating memory pages allocated to the process.

8. The data processing system of claim 2, wherein said migrating includes the second partition discovering network information relating to said first partition.

9. The data processing system of claim 2, wherein the program code further causes the data processing system to perform:
following the migrating, suspending activity of said second partition by reallocating all resources of said second partition.

10. The data processing system of claim 2, wherein the program code further causes the data processing system to perform:
designating said first partition as a recipient of all packets designated for said first partition and said second partition.

11. The data processing system of claim 2, wherein:
the image comprises a process; and
the migrating includes dynamically migrating memory pages allocated to the process.

12. The computer program product of claim 3, wherein said migrating includes said second partition discovering network information relating to said first partition.

13. The computer program product of claim 3, wherein the program code further causes the data processing system to perform:
in response to transferring said packets, suspending activity of said second partition by reallocating all resources of said second partition.

14. The computer program product of claim 3, wherein:
the image comprises a process; and
the dynamically migrating includes dynamically migrating memory pages allocated to the process.

* * * * *